United States Patent

[11] 3,590,229

[72] Inventor Johnny M. Humphreys
Houston, Tex.
[21] Appl. No. 716,853
[22] Filed Mar. 28, 1968
[45] Patented June 29, 1971
[73] Assignee Electronics Laboratories, Inc.
Houston, Tex.

[54] DIGITAL DIFFERENTIATOR
5 Claims, 1 Drawing Fig.

[52] U.S. Cl. .......... 235/152, 235/151.32, 235/183
[51] Int. Cl. .......... G06f 1/02, G06f 7/38, G06f 15/34
[50] Field of Search .......... 235/150.5, 150.51, 183, 152, 151.32

[56] References Cited

UNITED STATES PATENTS

| | | | |
|---|---|---|---|
| 3,174,106 | 3/1965 | Urban | 235/160 UX |
| 3,021,062 | 2/1962 | Steele | 235/152 |
| 3,424,987 | 1/1969 | Fluhr | 235/183 X |
| 3,448,255 | 6/1969 | Murphy | 235/150.51 |

*Primary Examiner*—Malcolm A. Morrison
*Assistant Examiner*—James F. Gottman
*Attorney*—Donald Gunn

ABSTRACT: For use with a data source furnishing data repetitively in digital form, apparatus which furnishes the value, first derivative, and second derivative of the data. A clock determines the rate of operation, or $\Delta t$. A first and then second value is stored and the difference represents the derivative. On repeating this, a second derivative is obtained. For the shortest representation, the difference signals are only the sign bit of the subtracted values.

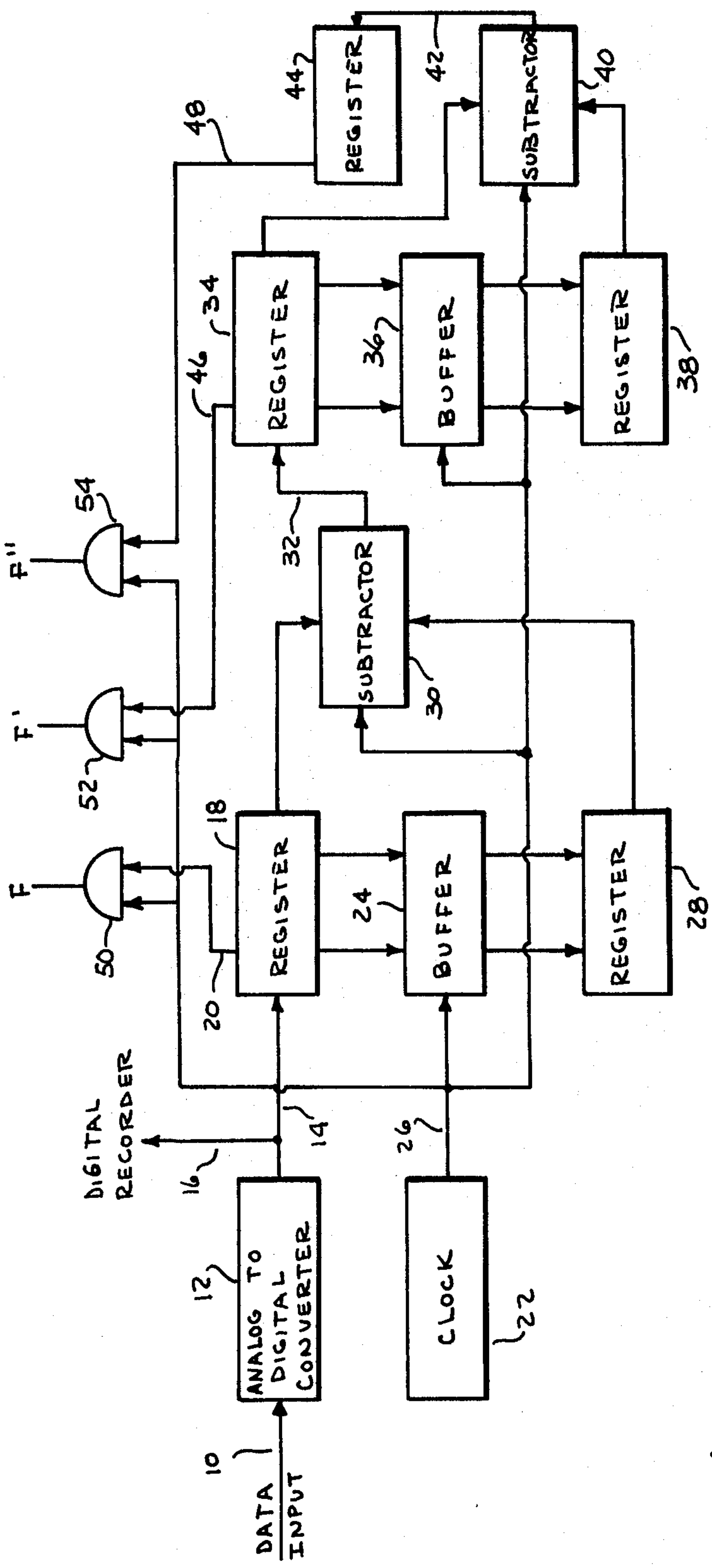
JOHNNY M. HUMPHREYS
INVENTOR.
BY Donald Gunn

DIGITAL DIFFERENTIATOR

SUMMARY OF PROBLEM AND SOLUTION

Continuously monitored variable data is often digitized for recording and computer analysis. In many fields of scientific endeavor such as medical analysis, a monitor or real time indicator of trends in the data is considered helpful. While computers can be programmed to obtain the various indicators or trends, this is expensive and cumbersome at best, typically requiring complicated programs. Thus, it has been difficult, if not possible, heretofore to obtain real time trends such as the value, first derivative and second derivative of data. By way of example, the analysis of an EEG (electroencephologram) is substantiated and assisted by information indicating the absolute value, first derivative and second derivative. With the above described problem in view, the present invention is summarized as incorporating register means whereby the sign bit of a digitized data word represents the absolute value of the variable, consecutive data words are compared at a timed rate to represent the first derivative, and data words representative of the first derivative are compared at a timed rate to obtain a representation of the second derivative.

With the foregoing in view, attention is directed to the included specification written hereafter and the single enclosed drawing, wherein:

The figure is a block diagram schematic of the circuitry of the present invention cooperative with a data source.

In the single drawing, the numeral 10 represents a data source input to a digital converter 12. The digital converter input is the analog signal from the data input from which the apparatus forms a digital word periodically representative of the analog value. By way of example, the digitizing rate might be 1,000 conversions per second of the variable 10 wherein a digital word is output on a conductor 14. The digital word 14 typically includes 5 to 15 bits representative of the variable, and a sign bit, typically the most significant bit. The numeral 16 represents a conductor extending to suitable digital recorder apparatus or other apparatus requiring data from the A-to-D converter 12.

The digital word on the conductor 14 is output at a periodic rate. The word is preferably supplied to a first register or storage means 18. Registers such as shown at 18 are known in the art, and are represented symbolically herein, it being assumed that one skilled in the art can construct and fabricate registers of various configurations for use with the present invention. In any event, the register 18 receives the data word from the A-to-D converter 12 by way of the conductor 14. The register 18 incorporates a number of storage components arranged to place the least significant bit in the same storage element and to place the most significant bit consistently also. The register 18 may thusly incorporate 11 storage components in cooperation with an A-to-D converter 12 which outputs a data word having a sign bit and 10 weighted data bits arranged in a consistent sequence. In any event, the operation of apparatus as described above is known to one skilled in the art. The device of the present invention uses an arrangement of data stored in the register means such that the sign bit is always located in the same storage element from which an output conductor 20 is connected for purposes to be described.

Routinely, the analog to digital converter 12 operates at a clocked rate. For purposes of the present disclosure, the clock 22 has been illustrated in cooperation with the other circuitry. After a first data word has been transferred from the converter 12 by the conduit 14 to the register means 18 and stored, that data word is then transferred into a buffer 24. While the buffer has been shown as a separate component, it can be merely a plurality of AND gates enabled by the clock pulse on the conductor 26. The significant factor in operation of the buffer means 24 is transfer of the first data word from the register or storage means 18 to a second storage means 28. Once the word is transferred by whatever means, the register 28 holds the first word while the register 18 stores a second or later occurring data word. At this juncture, the time sequence of the two words should be noted. With the analog to digital converter 12 operating at a regular rate, the two words represent timed measurements of the variable from the data input 10 and will be used in obtaining the first derivative of the variable in the below-described manner.

A digital subtractor circuit means 30 is connected to both the registers 18 and 28. Because a great number of subtracting techniques are known in the art wherein digital numbers are subtracted from one another, it is believed unnecessary to show the precise details of the subtracting means 30. For instance, one technique involves the obtaining of the complement of one of the digital numbers and adding it to the other. Other techniques are known and their availability for use in the present invention is noted in describing the circuit means 30. Without regard to details, the present apparatus envisions a circuit means 30 which, in response to the digital words in the registers 18 and 28, obtains the difference of the two values and forms a digital output signal on a conductor 32 to an additional register means 34. Of particular interest to the present invention is the fact that the means 30 operates each instant that a new digital word is transferred into the register 18 and the prior digital word is transferred to the register 28. Thus, a measure of the difference between the two values is obtained after each conversion of the analog value to digital representation. Moreover, the sign of the difference is preferably transferred through the conductor 32 to the register means 34. Considering one example of the digital output of the subtracting means 30, should the digital converter 12 provide a data word of 10 bits plus a sign bit, it is preferable that the output of the subtractor circuit means 30 include 10 bits and the sign bit. For this reason, the register means 34 preferably incorporates a like number of storage positions plus storage capacity for the sign bit also.

The register 34 stores the data word received from the subtractor means 30 for one count of operation. Since the means 30 continues to operate as new words are introduced to the register 18, so too must the word in the register 34 be transferred to a buffer means 36. The buffer 36 is preferably similar to the buffer 24. The buffer means 36 transfers the data from the register 34 to an additional register means 38. Thus, a first value is stored in the register 38 which is a measure of the first derivative of the variable 10. Likewise, a subsequently or later obtained value is stored in the register means 34. Since the two data words placed in storage occur at a timed rate, the difference thereof represents the derivative of the first derivative, or the second derivative.

The registers 34 and 38 both have output conductors communicating with a subtractor means 40 which is similar to the subtractor means 30. The data word from the register 34 is subtracted from the data word in the register 38 and the difference is output through a conductor 42 to a storage register 44. The data word in the register 44 may include the sign bit and 10 data bits, assuming the same size data word as mentioned hereinbefore. Since the subtractor means 40 works in the same manner as the means 30 previously described, it is believed that further descriptive material thereon is unnecessary.

The storage registers 34 and 44 are constructed and arranged in the manner of the register 18 and include storage components ranging from the least significant bit to the most significant bit. As in the register 18, the registers 34 and 44 are also connected by way of conductors 46 and 48 communicatIng with the most significant bit storage elements thereof with additional circuitry to provide the output of the present invention. As will be noted in the drawing, the conductors 20, 46 and 48 are input to a plurality of AND gates 50, 52 and 54. The AND gates are enabled by the clock pulse on the conductor 26 to output three signals, the signals being represented symbolically as the minimum bit representation of the function, its first derivative, and its second derivative. In all instances, the three gates output the sign bit of the various registers noted hereinbefore which serves as an indication or a measure of the data of interest.

The various outputs are provided to a suitable display apparatus as a real time indication of the trends of the data from the data source 10. As noted hereinbefore, many processes are best monitored with real time indications of the trends of the data. Most especially is this true in medical analysis. The device of the present invention provides the three trends at the outputs of the gates 50, 52 and 54 in real time. Should it be desirable to utilize a more definitive approximation of the three trends, the conductors 20, 46 and 48 may be communicated with additional significant storage components of the various registers. As will be recognized, additional significant bits in the various registers will provide far more accurate data if desired. Of course, this may be extended to include the entirety of the data word in each of the registers. However, this choice is left to the user upon definition of suitable accuracy of the data words transferred by the present apparatus and indicated in monitoring or testing the data as it is generated.

The third, fourth and fifth derivatives may be of interest also. The present invention accommodates additional stages, if desired.

While a number of alterations or variations of the preferred embodiment may be suggested, the scope of the present invention is determined by the claims appended hereto.

I claim:

1. A circuit apparatus for use with a flow of digitized multibit words of weighted values, comprising:
   a. first register means for receiving a first multibit word therein;
   b. second register means for receiving a second and subsequently occurring multibit word therein;
   c. subtractor means connected to said first and second register means for subtracting the words therein and obtaining a third word;
   d. third register means connected to said subtractor means for storing a word received therefrom;
   e. fourth register means for receiving and storing a word from said subtractor means, said word occurring after the word stored in said third register means; and
   f. second subtractor means connected to said third and fourth register means for subtracting the words therein and obtaining a word representative of the second derivative of the multibit words, the word from said second subtractor means being characterized in the fact that it is comprised of fewer bits than that of the multibit words.

2. The invention of claim 1 including a buffer means connected to said first and second register means for receiving a first word from said first register means and for subsequently transferring said first word to said second register means at a time at least partially coincident with storage of said second and subsequently occurring word in said second register means.

3. The invention of claim 1 including a buffer means connected to said third and fourth register means for receiving a third word from said third register means and for subsequently transferring said third word to said fourth register means at a time at least partially coincident with storage of said fourth and subsequently occurring word in said fourth register means.

4. The invention of claim 2 including a clock means connected with said buffer means for periodically operating said buffer means at a rate sufficient to transfer the first word from said first register means to said second register means prior to arrival of the second word.

5. The invention of claim 1 wherein the first flow of digitized multibit words each include a sign bit and bits of weighted value and further wherein said first and second register means includes multiple stages for receiving the bits thereof, and said second subtractor means forms an output which is a single bit.